United States Patent [19]
Karklys

[11] 3,922,889
[45] Dec. 2, 1975

[54] DIGITAL LOGIC CONTROL FOR AUTOMATIC WASHER

[75] Inventor: Joseph Karklys, St. Joseph, Mich.

[73] Assignee: Whirlpool Corporation, Benton Harbor, Mich.

[22] Filed: May 11, 1973

[21] Appl. No.: 359,548

Related U.S. Application Data

[62] Division of Ser. No. 211,885, Dec. 27, 1971, Pat. No. 3,783,651.

[52] U.S. Cl. .................................. 68/12 R; 307/141
[51] Int. Cl.² ......................................... D06F 33/02
[58] Field of Search .................. 68/12 R; 134/57 D; 307/141, 141.4

[56] References Cited
UNITED STATES PATENTS

| | | |
|---|---|---|
| 3,246,182 | 4/1966 | Hanchett .......................... 68/12 R X |
| 3,464,673 | 9/1969 | Cargo et al. ..................... 68/12 R X |
| 3,539,153 | 11/1970 | Wennerberg et al. .......... 68/12 R X |
| 3,774,056 | 11/1973 | Sample et al. ................... 134/57 D X |

Primary Examiner—Harvey C. Hornsby
Assistant Examiner—Philip R. Coe
Attorney, Agent, or Firm—Hill, Gross, Simpson, Van Santen, Steadman, Chiara & Simpson

[57] ABSTRACT

An automatic washer employs a digital control circuit comprising a programmable memory having an alterable information content controlled by operator actuated selection switches. A decoder reads the output of the memory and is operable to control driver circuits in accordance with the selected program, which driver circuits accordingly control the operation of associated machine elements.

6 Claims, 9 Drawing Figures

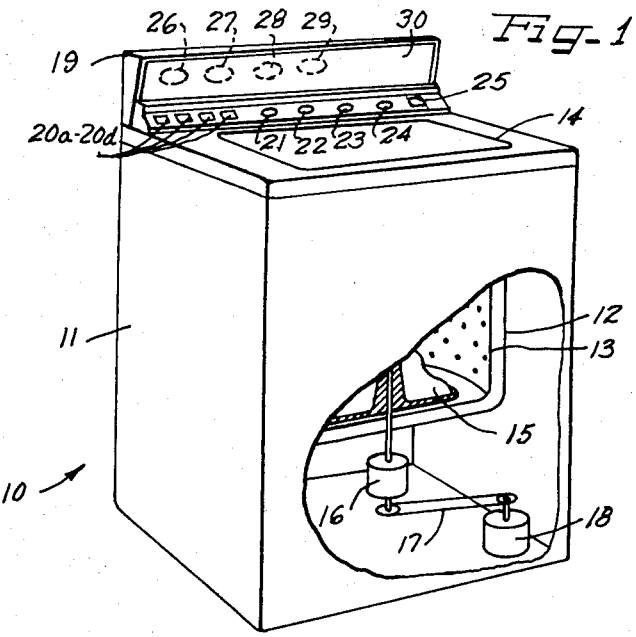
Fig-1
Fig-3
| FIG. 6 | FIG. 7 |
| --- | --- |
| FIG. 5 | FIG. 8 |
| FIG. 4 | FIG. 9 |
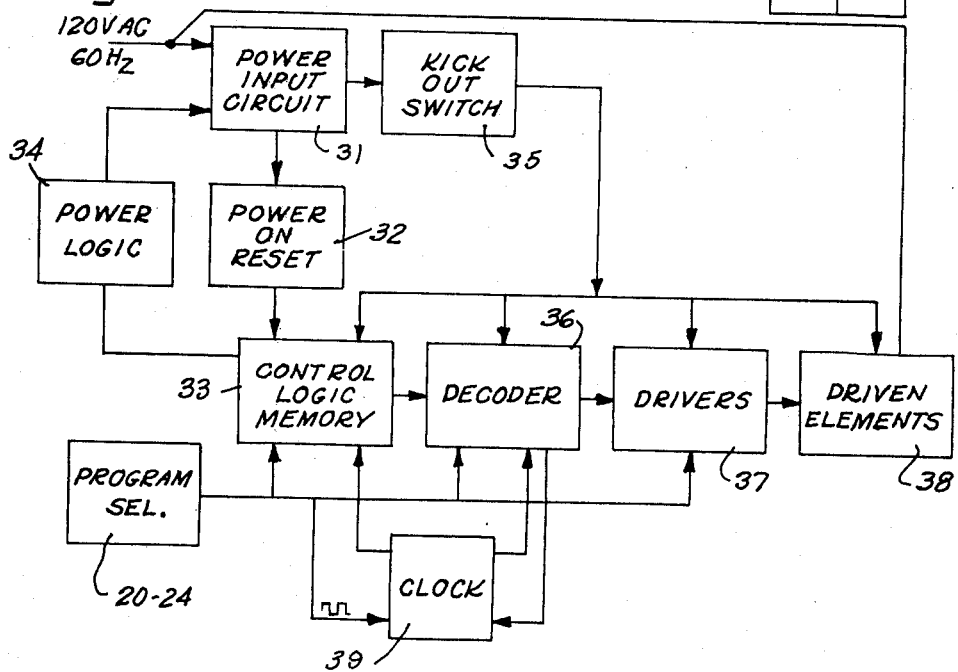
Fig-2

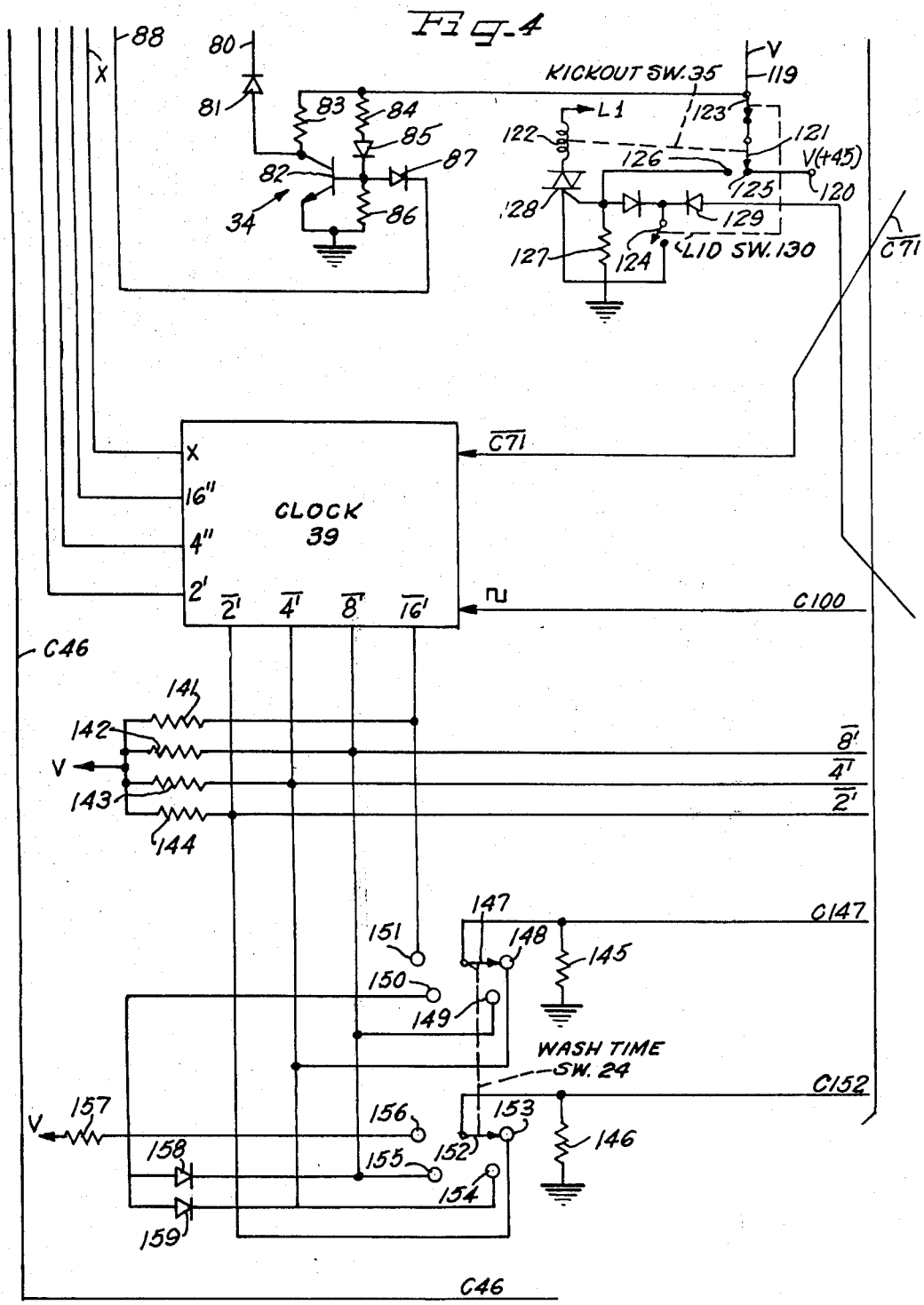

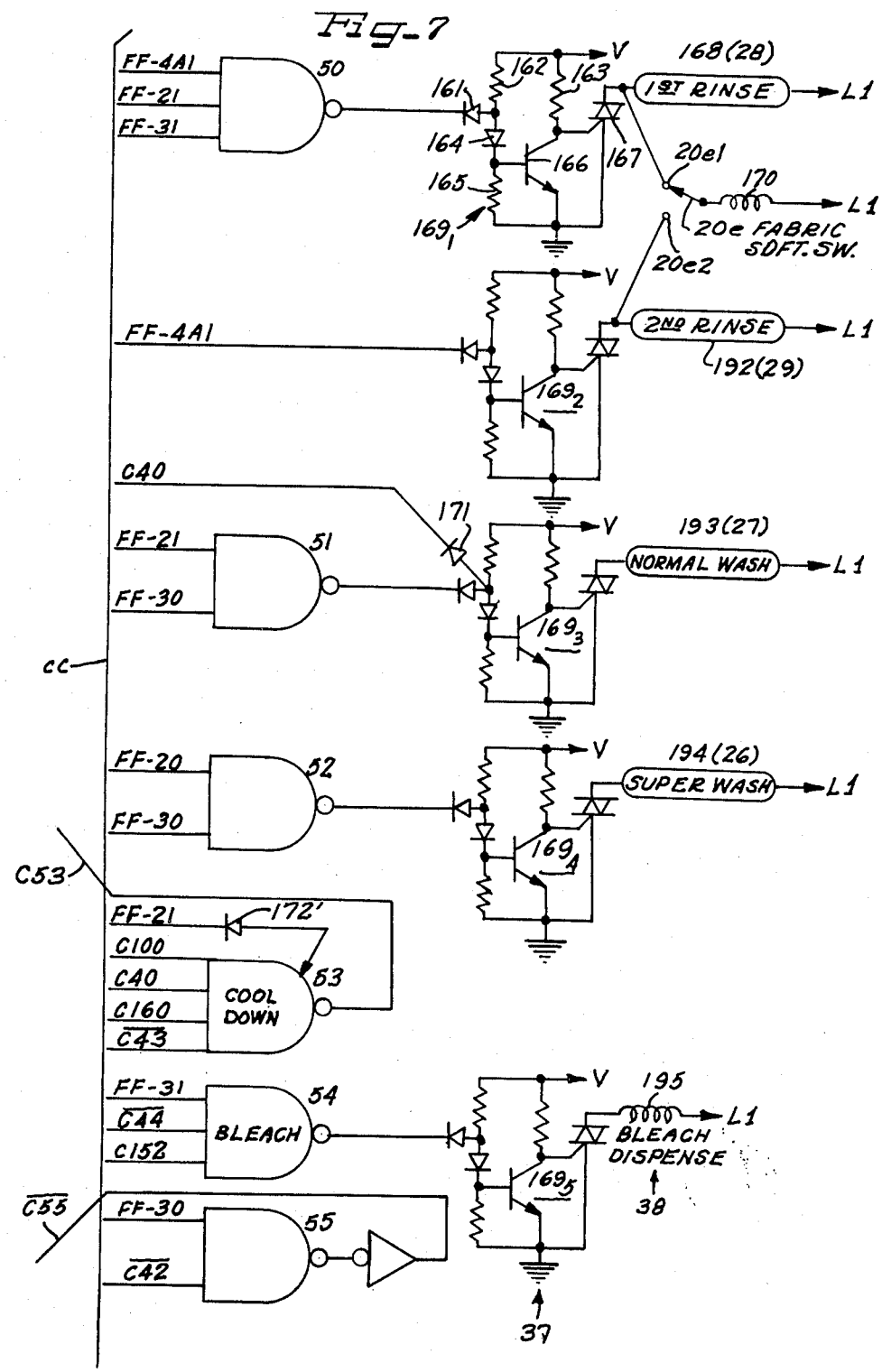

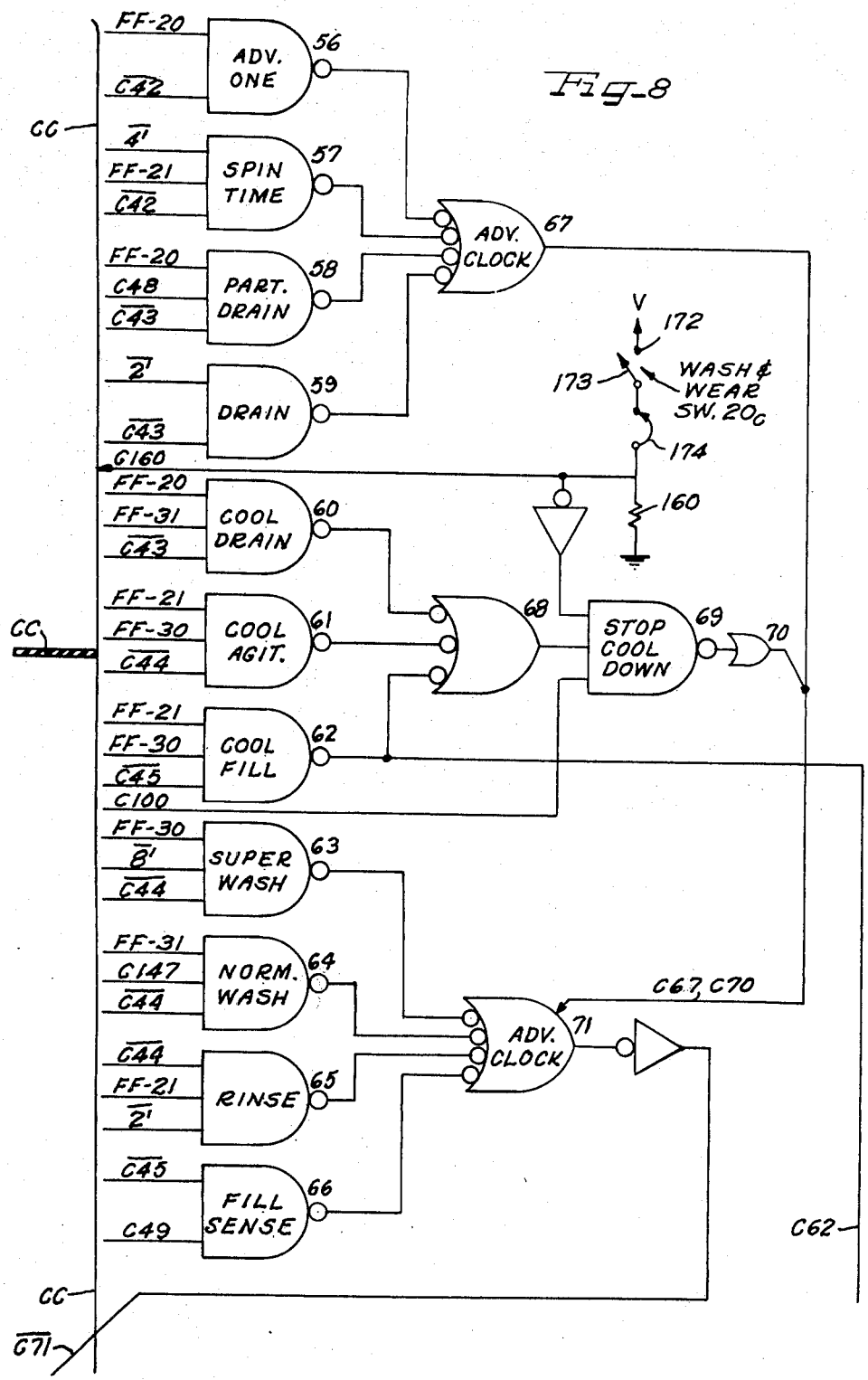

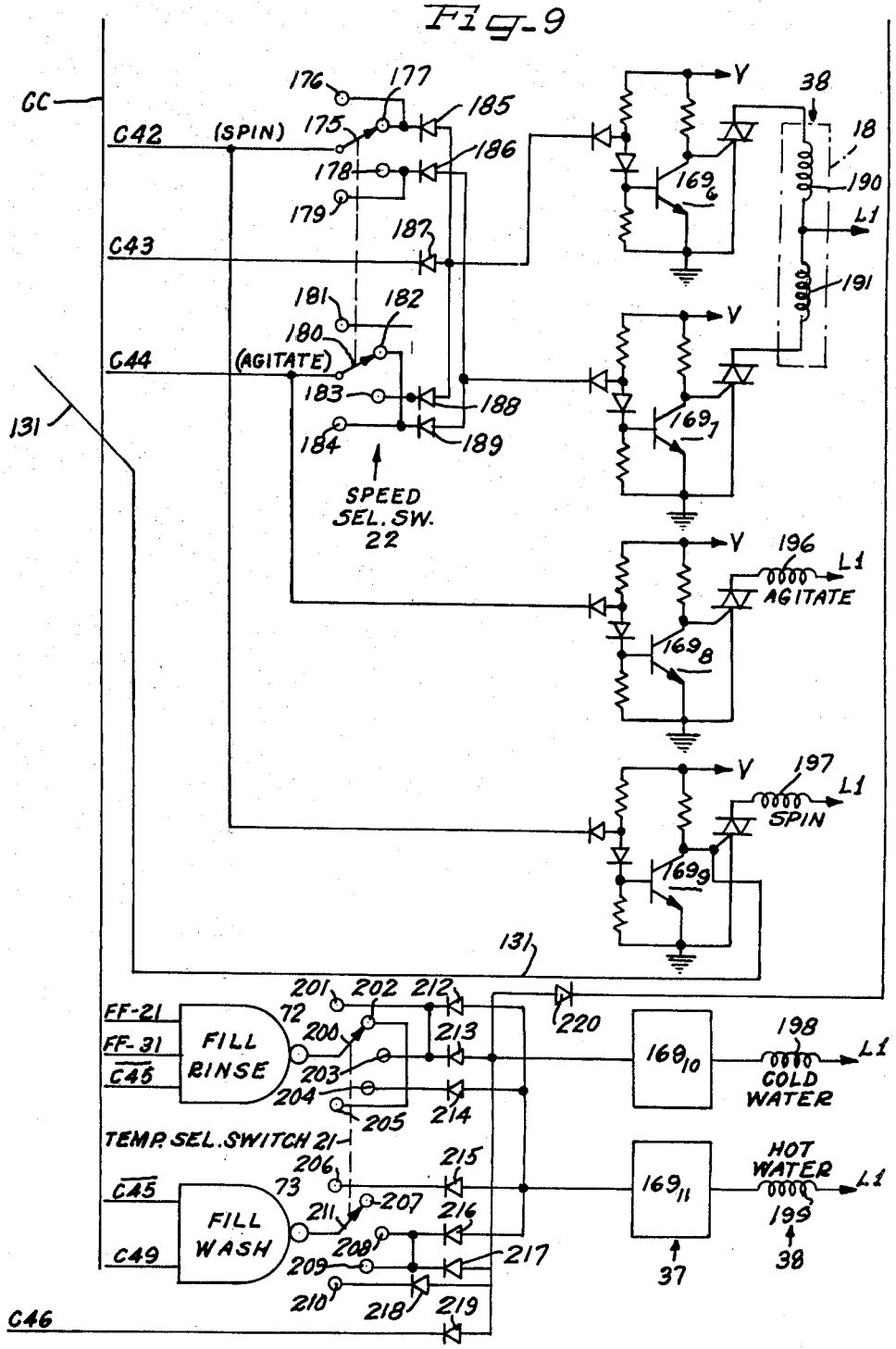

DIGITAL LOGIC CONTROL FOR AUTOMATIC WASHER

This is a division of application Ser. No. 211,885, filed Dec. 27, 1971, now U.S. Pat. No. 3,783,651.

BACKGROUND OF THE INVENTION

1. Field of the Invention

This invention relates to automatic clothes washing machines, and more particularly to digital logic control apparatus for controlling the operation of automatic clothes washing machines.

2. Description of the Prior Art

The numerous varieties of fabrics found in the home which may be subjected to laundering has led to the development of new and improved laundering techniques. For example, heavy articles such as overalls require a completely different washing program than one would utilize for more lightweight and delicate fabrics. In addition, the development of new fabrics and materials and processes for treating fabrics expands the abovementioned variety and accordingly requires various combinations of washing cycles for a washing program that is most effective for any given fabric or for a given group of like fabrics.

Heretofore, it was the general practice in the automatic washer art to provide a few basic washing programs that would generally cover the available types of fabrics. The realization of a control circuit for an automatic washer centered around the utilization of a timer which had a plurality of contacts, the number of contacts being related to the various washing functions of the individual programs. As additional fabrics and fabric treatments were developed, the motor-driven timer remained the focal point of automatic washer control circuits, however, more and more timer contacts were required in order that the new functions associated with new fabrics and techniques could be incorporated into the same basic control circuit configuration. Not only did the number of contacts and the size of the timers increase, but additional circuitry was sometimes necessary for modifying the operation of the timer so that all of the functions required in a program could be completed within a certain number of revolutions of the timer motor.

In an automatic washer which is to launder a wide variety of fabrics, the conventional motor-driven timer is therefore a generally inflexible instrument as the central portion of a control circuit.

SUMMARY OF THE INVENTION

In view of the general inflexibility of a motor-driven timer with respect to a wide variety of washing functions, it is highly desirable to have and a primary object of this invention to provide, an automatic washer control circuit which is completely flexible in its design with respect to the number of washing functions which may be required in a washing program. This application is related to my earlier application, Serial No. 837,163, filed June 27, 1969, assigned to the same assignee, and includes improvements thereover directed to the art of automatic washing machines.

Inasmuch as AC-operated control elements, such as solenoids, may be advantageously controlled on a digital basis, it is a further object of the present invention to provide a digital logic control circuit for an automatic washer.

With the exception of the various washing function controlling elements and indicators, which must be provided as discrete components, it is a further object of the present invention to provide an improved digital control circuit for automatic washers which may be constructed as an integrated circuit.

The foregoing and other objects of the invention are realized by the provision of a programmable memory which may be altered to store various washing programs, a decoder for reading the output of the memory as it is exercised, and a number of interface or driving amplifiers for operating the various controlled elements of a washer. The digital control circuit is further provided with a plurality of programming switches for selecting basic washing programs and washing program options, such as wash-and-wear and second rinse options. These selection switches are employed to directly alter the memory setting or indirectly alter the memory setting by way of the decoder.

A digital control system, according to the present invention, may be realized using standard diode and transistor logic DTL integrated circuits and the design approach of the system minimizes the number of integrated circuit packages. The function selection for determining the washing program is implemented, as much as possible, by using diode OR gates and switches to reduce the number of input/output pins when the circuit is integrated on a single chip.

The digital control of the present invention provides the following improvements over what has heretofore been known in the prior art:

1. Fully automatic wash-and-wear cycle using a minimum amount of water in response to the control provided by a water temperature thermostat.
2. A preselectable second rinse option with properly selected fabric softener dispensation.
3. Capability for push-button control adaptation in the selection of the basic washing programs.
4. An unlimited timing cycle extension for wash or soak time.
5. The elimination of washer shutdown during any part of the washing program.
6. Automatic cold water fill during a cool-down portion of the program.

BRIEF DESCRIPTION OF THE DRAWINGS

Other objects, features and advantages of the invention, its organization, construction and operation will best be understood from the following detailed description of an embodiment thereof taken in conjunction with the accompanying drawings, in which:

FIG. 1 is a perspective view of an automatic washer constructed in accordance with the principles of the present invention;

FIG. 2 is a block diagram of a digital logic control for an automatic washer according to the present invention;

FIG. 3 is an illustration of the proper arrangement of FIGS. 6–9 to form a complete automatic washer control circuit; and FIGS. 4–9 together form a schematic circuit diagram of a digital logic control circuit constructed in accordance with the principles of the present invention.

DESCRIPTION OF THE PREFERRED EMBODIMENT

General Description

Figure 5:
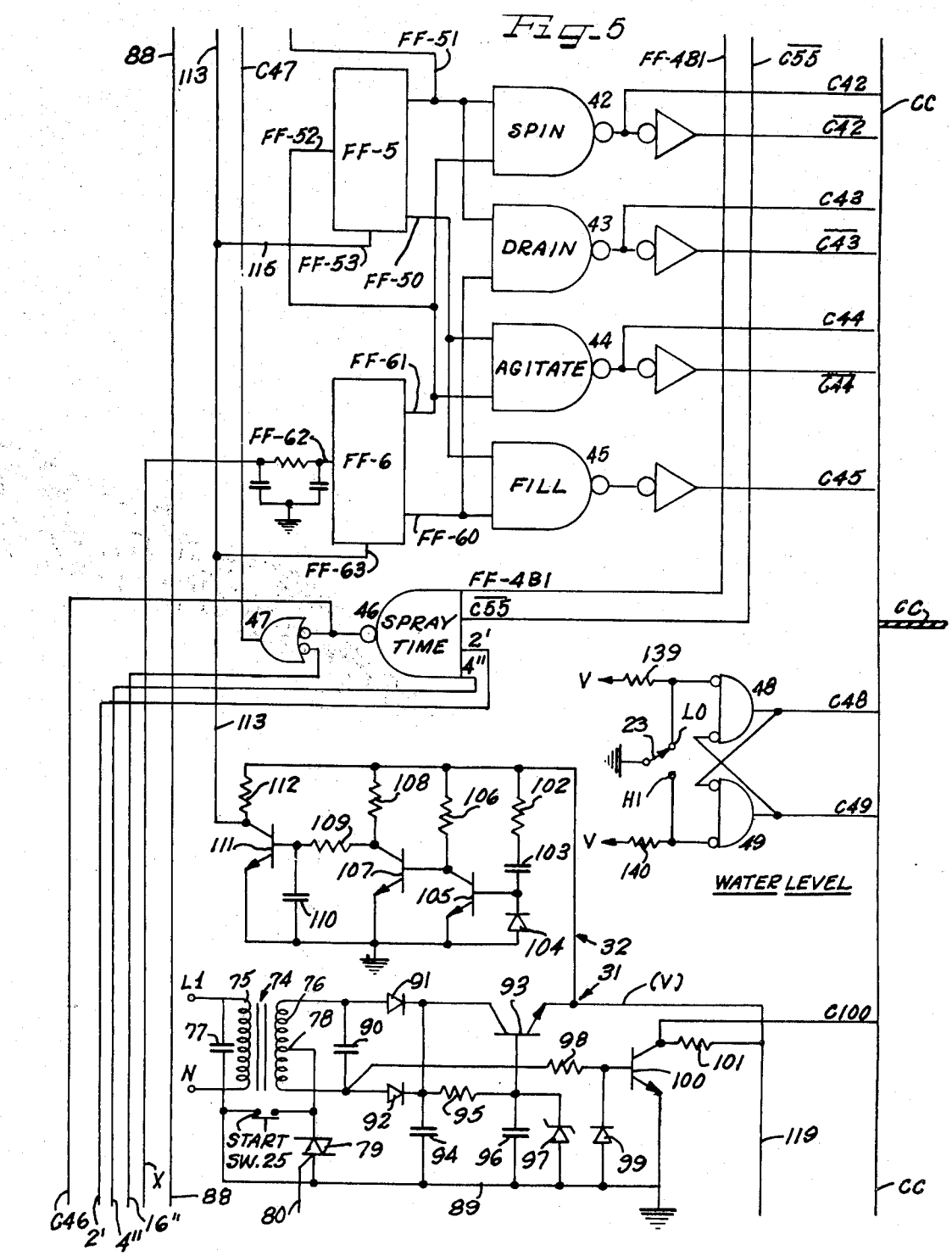

Referring to FIG. 1, an automatic washer is illustrated and generally referenced 10. The automatic washer 10 comprises a cabinet 11 having a tub 12 mounted therein for holding a washing solution. Mounted within the tub 12 is a perforate basket 13 and an agitator 15. Access to the interior of the perforate basket 13 is provided by way of a door 14. The spinning and agitation actions of the basket 13 and the agitator 15 are provided in a conventional manner by way of a transmission 16 which is driven by a motor 18 via a pulley and belt arrangement 17.

The automatic washer 10 further comprises a control console 19 which carries a plurality of functional switches 20a–20d, 21, 22, 23, 24 and 25, and a plurality of indicator lamps 26–29 which may be mounted behind a translucent or transparent protective panel 30. The panel 30 may advantageously carry instructions to aid an operator in programming the washer.

Referring now to FIG. 2, a digital control for the automatic washer of FIG. 1 is illustrated as comprising a power input circuit for converting the voltage from a commercial electrical supply, for example, 120 VAC at 60 Hz to potentials suitable for use by the control circuitry. Operating power for the digital circuitry is provided via a kick-out switch 35 which is illustrated as being connected to a control logic memory 33, a decoder 36, a set of drivers or interface amplifiers 37 and a set of driven elements 38. In addition, this same operating power is also provided to a power logic circuit 34, a power-on reset circuit 32, a clock 39 and a set of program selection switches 20–24; however, lines indicating these connections have been omitted from the drawing for clarity and will be readily understood from FIGS. 4–9 and the detailed description thereof.

The memory 33 includes a plurality of bistable circuits whose states are related to different washing functions. Inasmuch as transients may appear in the control circuit upon the application of potentials thereto, a power-on reset circuit is utilized for insuring that the bistable circuits are properly reset.

A power logic circuit 34 is provided and controlled by a bistable circuit of the memory 33 to terminate the application of power automatically at the end of a washing program.

The washing program and certain optional features are selected by the program selection switches 20–24. The control signals developed by these switches are primarily fed to the memory 33; however, in some instances, certain ones of these signals are also supplied to the decoder 36 and to the drivers 37. The memory 33 is operated by a clock 39 which is in turn driven by a square wave derived in the power input circuit 31 and by a portion of the decoder which controls advancing and resetting of the clock.

The decoder 36 translates the various output states of the memory 33 into control signals for operating the drivers 37. The selected program for the control logic circuit 33 provides a sequence of output conditions to the decoder in accordance with the washing functions to be performed and the decoder 36 in turn operates one or more of the drivers 37 for energizing or deenergizing respective ones of the driven elements 38 which are individually associated with the various washing functions.

DETAILED DESCRIPTION

Referring now to FIGS. 4–9 arranged as illustrated in FIG. 3, a schematic diagram of the circuit of FIG. 2 is shown in greater detail. In these figures, with the exception of the flip-flop circuits whose outputs are individually referenced, individual control conductors carry the reference numeral of the gate, switch, resistor, etc., which are concerned with the derivation of the signals carried on the conductors and has added thereto the prefix "C". For example, in FIG. 5, the output of a gate 42 is referenced C42. Individual inverters which follow some of the gate circuits have not been given reference characters; however, the outputs of these inverters have been given reference characters corresponding to the preceding gate and have added thereto an inversion indicator. Again, the gate 42 is followed by an inverter whose output is referenced $\overline{C42}$.

Inasmuch as most of the information flow in FIGS. 6–9 is from left to right, most of the conductors have been symbolically gathered into a cable CC for distribution and/or multiple distribution to the apparatus in the right-hand drawings of FIGS. 7–9. Some individual control conductors, particularly those which extend from right to left, have been individually illustrated and cross the distribution bus or conductor cable CC at an angle to differentiate these conductors from those which have been symbolically gathered together.

The individual circuits will be discussed below in detail before a description of machine operation is presented.

Power Input Circuit 31 (FIG. 5)

The power input circuit 31 comprises a pair of input terminals L1 and N which are connected to a primary winding 75 of a transformer 74. A capacitor 77 is also connected across the primary winding 75. The transformer 74 includes a center tap secondary winding 76 which is tapped at 78 and from there connected to the terminal N by way of a start switch 25. The center tap 78 is also connected to the terminal N by way of a Triac 79.

The power supply employs a series regulator stage including a transistor 93 which has its collector connected to one terminal of the secondary winding 76 by way of a diode 91 to the junction between a diode 92 and a resistor 95, and its base connected to the other terminal of the secondary winding 76 by way of the diode 92 and the resistor 95. Thus, the diodes 91 and 92 are connected to the collector of the transistor 93, and the resistor 95 is connected between the base and the collector of the transistor 93. A capacitor 90 is further connected across the secondary winding 76. The base of the transistor 93 is also connected to ground and to the terminal N by way of a capacitor 96 and a zener diode 97. An additional capacitor 94 is further connected between ground (conductor 89) and the junction of the diode 92 and the resistor 95. The base of the transistor 93 is further provided with a smooth dc potential by way of the elements 91, 92, 94, 95, and 96 and is limited to the breakdown potential of the zener diode 97, and the collector of the transistor 93 is provided with a direct current potential via diodes 91 and 92 which is smoothed by the capacitor 94. For purpose of illustration, the dc potential developed by the regulator circuit at the emitter of the transistor 93 is 4.5 volts.

The power input circuit 31 further includes a transistor 100 having a base connected to the junction of the diode 92 and one terminal of the secondary winding 76 by way of a resistor 98. The base of the transistor 100 is further connected to ground by way of a diode 99. The emitter of the transistor 100 is connected to ground and its collector is connected to the regulated potential V provided by the regulator circuit. The transistor 100 is biased so as to provide a positive square wave at the frequency of the input waveform, for example at 60Hz. This signal is used as the time base for the clock 39.

Power Logic 34 (FIG. 4)

An output conductor 119 carrying the supply potential V is connected to the power logic circuit 34 which comprises a transistor 82 having its emitter connected to ground, its collector connected to the conductor 119 by way of a resistor 83 and its base connected between the conductor 119 and ground by way of a resistor 84, a diode 85 and a resistor 86. With a low potential on the conductor 88 which is connected to the flip-flop FF-1 (FIG. 6), as will be the case upon reset, the low potential is provided by way of a diode 87 to the base of the transistor 82 to render the transistor nonconductive. This change of state of the transistor 82 causes a rise in potential at the collector thereof which is fed by way of a diode 81 and a conductor 80 to the Triac 79 of the power input circuit (FIG. 5). Therefore, when the start switch 25 is operated for a momentary contact, it shorts out the Triac 79 to permit current flow. The flip-flop FF-1 goes low, as will be understood from the description below, and the transistor 82 is operated to provide the gate drive to the Triac 79. At the end of the selected program, the gate drive is removed by a change of state of the flip-flop FF-1 causing a forward biasing of the transistor 82 and removal of the gate drive from the Triac 79. The Triac 79 then assumes a blocking state to remove all dc power from the control circuit.

Power-on Reset 32 (FIG. 5)

Figure 6:
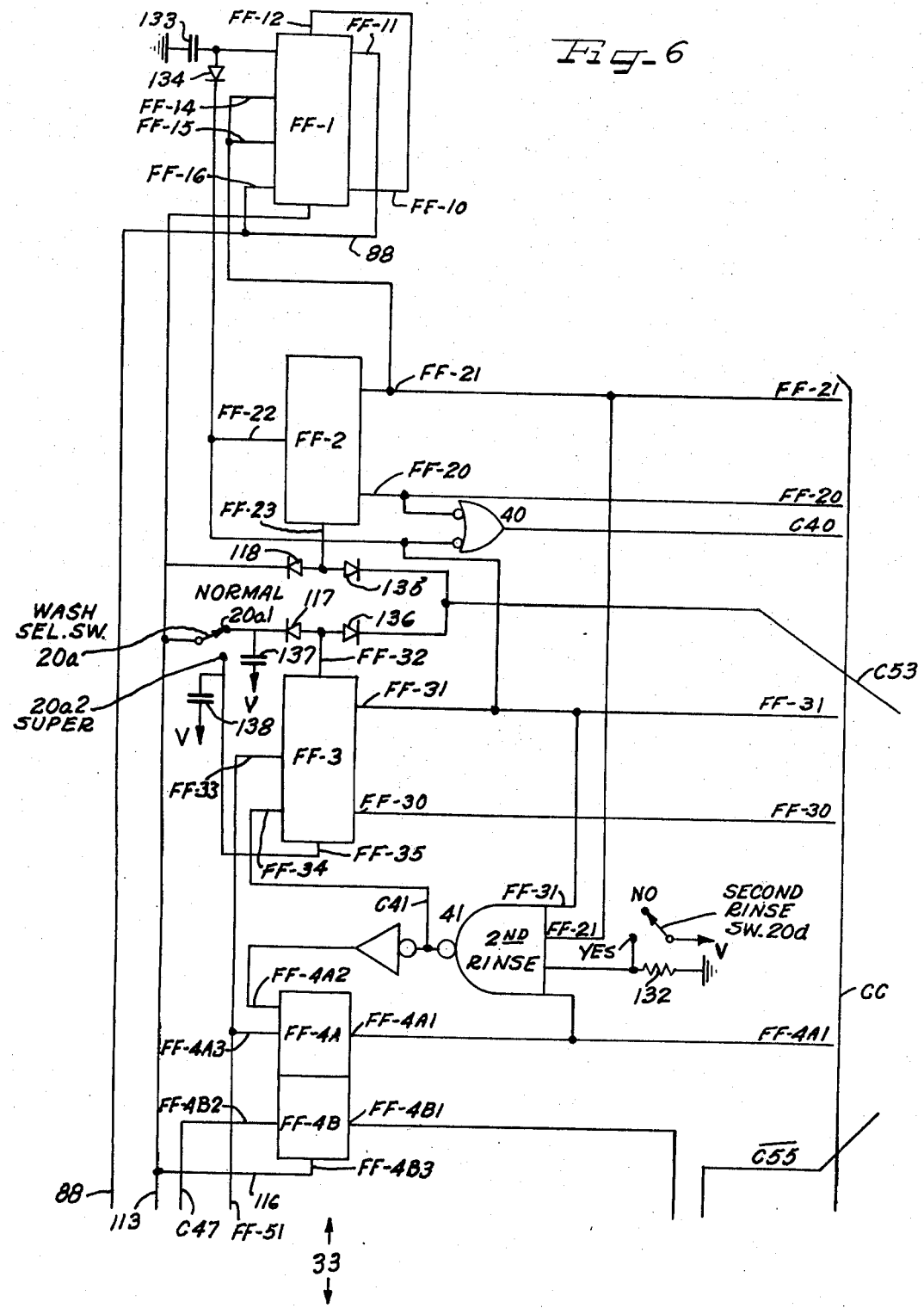

The power-on reset circuit includes a plurality of transistors 105, 107, 111, each of which has its emitter connected to ground and each of which has its collector connected to the emitter of the regulator transistor 93 by way of a respective resistor 106, 108, 112. The transistor 105 has its base connected to ground by way of a diode 104 and to the potential V by way of a capacitor 103 and a resistor 102. The application of the potential V to the upper terminal of the resistor 102 effects a forward biasing of the transistor 105 by initiating charging of the capacitor 103. The collector of the transistor 105 starts conducting and approaches ground potential thereby removing the initial forward bias of the transistor 107. The collector of the transistor 107 therefore rises toward the potential V and this changing potential is presented to a capacitor 110 connected between the base of the transistor 111 and ground via a resistor 109 to forward bias the transistor 111 and present substantially ground potential by way of its collector and a conductor 113 to each of the flip-flop circuits FF-1 – FF-6 (FIGS. 5 and 6). This reset signal causes all of the flip-flops to be reset so that their true outputs become false, true being high and false being low.

Kick-Out Switch 35 (FIG. 4)

The potential V is also supplied by way of the conductor 119 to the kickout switch 35 and to associated switching circuitry concerned with the application of power to the control circuit. The potential V on the conductor 119 is extended by way of a contact 123 of a lid switch 130 and a contact 121 of the kick-out switch 35 to a distribution terminal 120 for the remainder of the control circuit. The kick-out switch 35 includes a winding 122 which is connected between AC line L1 potential and ground by way of a Triac 128 which has a gate electrode connected to a contact 126 of the kick-out switch 35 so that movement of the contact 121 upon an unbalance condition causes the application of the regulated potential to the gate electrode for energizing the winding 122 and maintaining the aforementioned circuit to the terminal 120 in an open condition. Upon unbalance and the transfer of the contact 121 to engage the contact 126, a resistor 127 is provided as a load for the power supply. It will be noted that if the lid switch 130 is opened, the contacts 123 also open the power connection to the terminal 120. The circuit further includes a diode 129 for shunting a gating signal to ground when the lid switch 130 is operated to close the contact 124 during a spin operation as a safety feature so that spinning will be terminated when the access door 14 is opened. (See conductor 131 and FIG. 9).

Drivers 37 and Driven Elements 38 (FIGS. 7 and 9)

The driven elements of an automatic washer operate either to control a washing function or to provide an indication of a washing function. These elements are generally provided in the form of solenoid operated devices, the washing machine drive motor 18 and indicator lamps. In FIG. 7, a plurality of indicator lamps 168, 192, 193 and 194 represent operation of the washing machine during a first rinse, a second rinse, a normal wash program and a super wash program, respectively. FIG. 7 also includes a solenoid winding 170 which is utilized for dispensing fabric softener and a bleach dispense solenoid winding 195 which is utilized for dispensing bleach. In FIG. 9, the drive motor 18 is illustrated as having a high speed winding 190 and a low speed winding 191. Also illustrated in FIG. 9 are solenoid windings 196, 197, 198, and 199 for controlling agitation, spin, cold water dispensing and hot water dispensing, respectively.

Inasmuch as the individual driver circuits $169_1$ – $169_{11}$ for energizing the aforementioned controlled elements 38 are substantially identical, only one such circuit will be discussed in detail, the operation of the remaining driver circuits being readily apparent.

A driver circuit $169_1$ includes a transistor 166 which is normally forward biased. The transistor 166 has its emitter connected to ground and its collector connected by way of a resistor 163 to the potential V. The base of the transistor 166 is connected to ground by way of a resistor 165 and is connected to the potential V by way of a resistor 162 and a diode 164. A further diode 161 is connected to the junction of the resistor 162 and the diode 164 and is fed by a gate circuit, here the gate 50. Upon the initial application of dc potential, the transistor 166 has a positive potential applied across its base-emitter circuit so that the transistor is rendered conductive. The collector of the transistor is therefore at approximately ground potential and the associated Triac 167 is prevented from becoming conductive.

Upon the application of a low logic potential from the gate 50 to the junction of the resistor 162 and the diode 164 by way of the diode 161, the transistor 166 becomes reverse biased and is rendered nonconductive so that its collector rises toward the potential V thereby providing a gating potential to the gate of the Triac 167. The Triac 167 is connected in series with the indicator lamp 168 between the terminal L1 and ground so that conduction thereof effects illumination of the lamp 168. The same action holds true for the energization of a solenoid winding by such a driver circuit.

Although the energization of the winding 170 could be effected through programming and a decoder and separate driver circuit, in this particular embodiment of the invention a switch 20e is provided and selectively connectible to contacts 20e1 and 20e2 of the first rinse and second rinse circuits. Therefore, if fabric softener is to be dispensed in the first rinse, the switch 20e is positioned to engage the contact 20e1. On the other hand, if fabric softener is to be dispensed during a second rinse operation, the switch 20e is positioned to engage the contact 20e2.

Clock 39 (FIG. 4)

The clock 39 may be constructed utilizing techniques for following standard binary division rules; however, any time period may be obtained by the use of proper feedback techniques. Details of a clock which may be utilized are disclosed in my United States patent application, Ser. No. 837,179, filed June 27, 1969, now U.S. Pat. No. 3,639,844, assigned to the same assignee as the present invention. In order to simplify and economize, the particular circuit utilized for the clock 39 will employ a one-minute period that is 64 seconds in duration. Any multiples of minutes indicated in this illustrative embodiment are therefore multiples of 64-second intervals. A standard binary frequency divider will therefore utilize, for example, 17 binary stages to obtain a 16-minute interval. Fewer stages may, however, be used by providing ORing of the available time outputs, e.g. 2 minutes plus 4 minutes equals 6 minutes.

The clock 39 is provided with a toggle input by way of the conductor C100 at, for example, 60Hz. The clock is further provided with a reset pulse for reinitiating timing by way of the conductor $\overline{C71}$ of a clock advancing portion of the decoder 36 (FIG. 8). The particular clock illustrated utilizes the outputs $\overline{2'}, \overline{4'}, \overline{8'}, \overline{16'}$, and 2', 4'' and 16'', although it is readily apparent that other available outputs may be utilized as desired in particular applications.

Water Level Switch Circuit (FIG. 5)

In order to prevent contact bounce from interfering with the settings of the bistable circuits, the water level switch 23 has been provided with an anti-bounce feature to inhibit the production of transients as the switch moves between its low and high positions. This feature is provided by the AND gates 48 and 49 which have their outputs cross-connected as inputs each to the other so that the derivation of a signal at the resistors 139, 130, respectively, is transmitted only once to the respective conductors C48, C49 by way of the gates 48, 49. As the output of a gate, say the gate 48, goes high in response to the switch contact engaging the LO contact, the low output of the gate 49, through inversion, latches the gate 48 which, in turn, prevents the gate 49 from passing a signal due to switch bounce.

Memory 33 (FIGS. 5 and 6)

The memory 33 primarily comprises a plurality of flip-flop circuits FF-1, FF-2, FF-3, FF-4A, FF-4B, FF-5 and FF-6. These flip-flops are initially reset, as described above, upon the application of power to the control circuit and are programmed by the operation of selection switches so that they may be permutated through a sequence representing functional machine operations under the control of the decoder 36 and the clock 39.

One of the selection switches for establishing a desired washing program is provided by the switch 20a having contacts 20a1 representing a normal wash cycle 20a2 representing selection of a super wash cycle. Selection of a normal wash cycle causes the ground potential on the conductor 113 to be applied to the setting input FF-32 of the flip-flop FF-3, while selection of the super wash cycle causes this potential to be applied to the setting input FF-35 of the flip-flop FF-3. The flip-flop FF-3 therefore controls that part of a washing program concerned with normal and super washing cycles.

The flip-flops of the memory 33 are programmed and re-programmed by various other switches and by the decoder in accordance with the operation of selection switches as will be understood from the description below; however, a complete sequence of operations covering all possible washing functions as far as the illustrative embodiment is concerned is set forth in the following truth table of sequential operations.

TRUTH TABLE I

| Step No. | Function | FF-6 | FF-5 | FF-3 | FF-2 | FF-1 | FF-4A* |
|---|---|---|---|---|---|---|---|
| S1 | Fill | 0 | 0 | 0 | 0 | 0 | 1 |
| S2 | Pre-Wash | 1 | 0 | 0 | 0 | 0 | 1 |
| S3 | Partial Drain | 0 | 1 | 0 | 0 | 0 | 1 |
| S4 | Advance | 1 | 1 | 0 | 0 | 0 | 1 |
| S5 | Fill | 0 | 0 | 1 | 0 | 0 | 1 |
| S6 | Wash | 1 | 0 | 1 | 0 | 0 | 1 |
| S7 | Partial Drain | 0 | 1 | 1 | 0 | 0 | 1 |
| S8 | Advance | 1 | 1 | 1 | 0 | 0 | 1 |
| S9 | Fill | 0 | 0 | 0 | 1 | 0 | 1 |
| S10 | Agitate (Cool Down) | 1 | 0 | 0 | 1 | 0 | 1 |
| S11 | Drain | 0 | 1 | 0 | 1 | 0 | 1 |
| S12 | Spin-Spray | 1 | 1 | 0 | 1 | 0 | 1 |
| S13 | Fill | 0 | 0 | 1 | 1 | 0 | 1 |
| S14 | Deep Rinse | 1 | 0 | 1 | 1 | 0 | 1 |
| S15 | Drain | 0 | 1 | 1 | 1 | 0 | 1 |
| S16 | Spin | 1 | 1 | 1 | 1 | 0 | 1 |
| S17 | Fill | 0 | 0 | 1 | 1 | 0 | 0 |
| S18 | Second Rinse | 1 | 0 | 1 | 1 | 0 | 0 |

TRUTH TABLE I-continued

| Step No. | Function | Complete Program | | | | | |
|---|---|---|---|---|---|---|---|
| | | FF-6 | FF-5 | FF-3 | FF-2 | FF-1 | FF-4A* |
| S19 | Drain | 0 | 1 | 1 | 1 | 0 | 0 |
| S20 | Spin | 1 | 1 | 1 | 1 | 0 | 0 |
| S21 | End of Cycle | 0 | 0 | 0 | 0 | 1 | 0 |

*FF-4A is shown with the second rinse selected. If second rinse is not selected, FF-4A would be at logic "0" for the duration of the cycle.

Decoder 36 (FIGS. 5-9)

The decoder 36 comprises a plurality of AND and OR gates 40-47 and 50-73 for reading the outputs of the memory 33, the position of programming switches, and outputs of the clock 39. For the most part, the gates have been provided with functional legends to aid in understanding the operations controlled thereby. Detailed discussion of the operation of the decoder will be reserved for such discussion as relates to individual portions thereof in the description of operation of the automatic washer in accordance with respective washing programs.

Operation

In the embodiment of the invention illustrated herein, the machine operator selects a basic washing cycle by depressing one or more of the push button switches 20a-20d. The operator then selects water temperature, agitate and spin speeds, water level and wash time by selective manipulation of the switches 21-24. When the selection is completed, the start switch 25 is depressed to initiate operation of the automatic washer in accordance with the selected program.

The following combinations of basic cycles can be selected in the apparatus illustrated in FIGS. 4-9.
1. Super Wash
2. Normal Wash
3. Super Wash and Second Rinse
4. Normal Wash and Second Rinse
5. Super Wash and Wash-and-Wear
6. Normal Wash and Wash-and-Wear
7. Super Wash, Wash-and-Wear and Second Rinse
8. Normal Wash, Wash-and-Wear and Second Rinse

Super Wash

When the machine is programmed for super wash, it operates in accordance with the following truth table.

TRUTH TABLE II

| Step No. | Function | Super Wash Program (Second Rinse Not Selected) | | | | | |
|---|---|---|---|---|---|---|---|
| | | FF-6 | FF-5 | FF-3 | FF-2 | FF-1 | FF-4A |
| S1 | Fill | 0 | 0 | 0 | 0 | 0 | 0 |
| S2 | Pre-Wash | 1 | 0 | 0 | 0 | 0 | 0 |
| S3 | Partial Drain | 0 | 1 | 0 | 0 | 0 | 0 |
| S4 | Advance | 1 | 1 | 0 | 0 | 0 | 0 |
| S5 | Fill | 0 | 0 | 1 | 0 | 0 | 0 |
| S6 | Wash | 1 | 0 | 1 | 0 | 0 | 0 |
| | ADVANCE | | | | | | |
| S11 | Drain | 0 | 1 | 0 | 1 | 0 | 0 |
| S12 | Spin-Spray | 1 | 1 | 0 | 1 | 0 | 0 |
| S13 | Fill | 0 | 0 | 1 | 1 | 0 | 0 |
| S14 | Deep Rinse | 1 | 0 | 1 | 1 | 0 | 0 |
| S15 | Drain | 0 | 1 | 1 | 1 | 0 | 0 |
| S16 | Spin | 1 | 1 | 1 | 1 | 0 | 0 |
| | ADVANCE | | | | | | |
| S21 | End of Cycle | 0 | 0 | 0 | 0 | 0 | 0 |

Selection of the super wash program provides pre-wash, wash, spin-spray and rinse functions.

Step S1

The filling time is controlled by the infinite water level sensing switch 23. When in filling, the water level switch is in the LO position, a logic "0" is supplied to the fill sense gate 66 by way of the conductor C49. When the selected water level has been reached and the switch transfers to the HI position, causing a logic "1" to be applied to the fill sense gate 66 and its output goes low causing the clock to advance by way of the OR gate 71 and the conductor $\overline{C71}$ which is connected to the clock 39.

The temperature for rinse and wash has been selected by the setting of the temperature selection switch 21 and the diodes 212-219 provide the proper combination of hot and cold water solenoid activations in accordance with the decoded states of the flip-flops FF-2, FF-3, FF-5, and FF-6 (via gate 45) and the water level switch 23 (via gate 49) as can be seen from the inputs FF-21, FF-31 and $\overline{C45}$ of the fill rinse gate 72 and the inputs $\overline{C45}$ and C49 of the fill wash gate 73.

Step S2

Upon advance of the clock, the output FF-61 becomes true so that the agitate gate 44 with a true input also supplied thereto by way of the output FF-50 of the flip-flop FF-5 is enabled to provide output signals on the conductor C44 and $\overline{C44}$. The output signal on the conductor C44 is fed to the speed selection switch 22 and by way of its setting of the contact 180 and the associated one of the diodes 188, 189 to energize the respective driver circuit 169 for energizing the corresponding high speed winding 190 or low speed winding 191. In addition, the signal applied to the conductor C44 is fed to the driver 169 associated with the agitate solenoid 196 for causing a gating potential to be applied to the Triac thereof for energizing the winding 196.

The wash time may be selected in four-minute increments up to sixteen minutes. A 12-minute interval may be obtained by ORing eight-and four-minute periods by way of the diodes 158, 159. These wash time signals are provided at the lower portion of the clock 39 illustrated in FIG. 4 and are referenced $\overline{2}'$, $\overline{4}'$, $\overline{8}'$ and $\overline{16}'$. The wash time switch 24 includes a pair of output conductors C147 and C152. The conductor C147 is utilized for controlling clock advance by way of the gates 64, 71 (FIG. 8) and the output conductor C152 is utilized for controlling dispensing of bleach by way of the gate 54 and the driver 169 interposed between the gate 54 and the bleach dispense solenoid winding 195. In FIG. 4 of the illustrated embodiment, the wash time is set with the switch contact 147 engaging the switch contact 148 which is fed by the $\overline{4}'$ output of the clock 39 for a 4-minute wash time and the contact 152 is engaged with the contact 153 which is connected to the 2-minute or $\overline{2}'$ output of the clock 39. Therefore, the wash time has been selected at 4 minutes with a bleach dispensing operation occurring after 2 minutes. This is the normal wash procedure, however, attention is invited to the additional outputs of $\overline{2}'$, $\overline{4}'$, and $\overline{8}'$ of the clock 39 wherein the output signals which are developed across the resistors 142–144 are further utilized for decoding whereby the $\overline{8}'$ signal is extended to a super wash gate 63 so as to fix the super wash time at a predetermined interval, here 8 minutes. Clock advance is therefore controlled by way of the gates 63 and 71 in the super wash program.

Step S3

Partial drain termination is controlled by the "LO" position of the water level switch 23. Switch closure applies a logic "1" to the partial drain gate 58 effecting clock advance by way of the gate 67 and the gate 71. The actual drain operation is accomplished in a well known manner in accordance with the energize conditions of the agitate and spin solenoids in connection with pumping apparatus which effects recirculation or discharge of the washing liquid in a well known manner.

Step S4

In order to maintain uniformity in the decoding gates, Step S4 (also Step S8) is permitted to occur as an "advance-one-step" function. This step replaces the spin-spray function in the super wash and wash-and-wear portions of a selected program. In the normal or regular wash program, the gate 56 which produces the advance step is disabled by the signal applied to its input by way of the conductor FF-20 in accordance with the condition of the flip-flop FF-2.

Step S5

The second fill operation is similar to the fill operation of Step S1, with the wash time fixed in the super wash program and selectable in the normal wash program, clock advance being controlled respectively by way of the gates 63 and 64.

When the wash-and-wear option is not selected, the wash-and-wear swtich 20c (FIG. 8) has its contacts 172, 173 disengaged so that a ground potential is derived by way of the resistor 160 and applied to the stop cool down gate 69 as a high potential. The stop cool down gate 69 also includes a high input from the gate 68 due to the conditions at the inputs of the gates 60–62. The gate 69 also has a pulsing input at, for example, 60 Hz, supplied over the conductor C100 so that the clock is repetitively advanced by way of the gates 69, 70 and 71 until the step S11 is reached whereupon the states of the memory flip-flops inhibit the gate 68 to stop advancing of the clock 39.

Step S11

The flip-flop output conductors FF-51 and FF-60 are high enabling the drain gate 43 to provide a low output on the conductor C43 and a high output on the conductor $\overline{C43}$. The low potential on the conductor C43 is employed in FIG. 9 to energize the high speed winding 190 of the motor 18 and the deenergized conditions of the agitate and spin solenoid windings 196, 197 causes the motor to operate the pump for discharging the washing liquid. The drain interval has been selected in this particular embodiment for two minutes as can be seen in FIG. 8, whereupon the drain gate 59 is enabled to cause clock advance by way of the gates 67 and 71.

Step S12

Advancing of the clock causes the flip-flop FF-6 to assume a binary state wherein a high signal is provided at its output FF-61, which coupled with a high output on the flip-flop FF-5 output FF-51 causes the spin gate 42 to apply a low signal on the conductor C42 and a high signal on the conductor $\overline{C42}$. The low signal on the conductor $\overline{C42}$ causes the high speed winding 190 of the motor 18 to be energized for a high speed spin and causes energization of the spin solenoid winding 197 to effect spinning of the basket 13. In addition, the spin-spray gate 55 is enabled by the high input on the conductor C42 and the high input supplied by the output FF-30 of the flip-flop FF-3 to provide a high signal (see FIG. 7) by way of the conductor $\overline{C55}$ to the gate 46 (FIG. 5). The flip-flop FF-4B provides a high input to the gate 46 as does the clock 39 for a 2-minute interval by way of the output 2' and for every 4 seconds by way of the clock output 4". Therefore, for a period of 2 minutes, a 4-second cold water spray is released every 32 seconds. The cold water addition is provided by way of the low signal from the gate 46 by way of the conductor C46 which extends downwardly across FIGS. 5 and 4 and then to the right across FIGS. 4 and 9 to the diode 219 and then to the driver circuit 169 associated with the cold water solenoid winding 198. At the end of the 2-minute interval, the flip-flop FF-4B has its output FF4B1 conditioned low by way of the gates 46, 47 and the conductor C47 connected to the input FF-4B2 to terminate the water spray.

The spin-spray function may be eliminated in the super wash program and in the wash-and-wear program in accordance with the discussion set forth above with respect to the advance step S4. In the normal cycle, it can be seen that the gate 56 is employed to advance the clock 39.

Step S13

The filling step of S13 is substantially the same as the previous filling steps with the exception that this filling is concerned with the rinsing function of the following step of the program.

The filling time is controlled as discussed above by way of the infinite water level sensing switch. The inputs to the fill gate 45 are provided with high potentials whereby a high potential is provided on the output conductor $\overline{C45}$. This potential, along with the high potentials provided at the output conductors FF-31 and FF-21 of the flip-flops FF-2 and FF-3, enable the rinse fill gate 72 (FIG. 9) to supply a low signal by way of the switch contact 200 and the selected associated contacts 201–205 to energize the appropriate solenoid windings 198, 199. The fill sense gate (FIG. 8) detects transfer of the water level switch 23 to the HI position upon reaching the preset water level in order to advance the clock 39 by way of the advance clock gate 71.

Step S14

The deep rinse function is quite similar to the above-described washing functions. The flip-flops FF-5 and FF-6 supply high signals at their output conductors FF-50 and FF-61 to enable the agitate gate 44 and provide a low signal on the conductor C44 and a high signal on the conductor $\overline{C44}$. The low signal on the conductor C44 is extended to the speed selection switch 22 and by way of the contact 180 and a selected one of the contacts 181–184 thereof and the associated selected diode 188, 189 to energize either the high speed winding 190 or the low speed winding 191 of the motor 18. The low signal on the conductor C44 is also extended to the driver associated with the agitate solenoid winding 196 for energizing that winding and effect engagement of the agitator 15.

The deep rinse agitate function continues and is timed by the rinse gate 65 to advance the clock 39 by way of the advance clock gate 71. Clock advance occurs when the clock times a preset period, here 2 minutes as indicated by the $\overline{2}'$ input to the rinse gate 65 which causes the gate to be enabled along with the high signals already applied thereto by way of the conductor $\overline{C44}$ and the output conductor FF-21 of the flip-flop FF-2.

Step S15

The flip-flop FF-6 provides a high signal on its output FF-60 and the flip-flop FF-5 provides a high signal on its output FF-51 to enable the drain gate 43 and provide a low signal on the conductor C43 and a high signal on the conductor $\overline{C43}$. The low signal on the conductor C43 is applied to the diode 187 (FIG. 9) to effect energization of the high speed winding 190 of the motor 18 by way of its associated driver circuit 169. The drain time is again controlled by way of the drain gate 59 after 2 minutes of pumping (windings 196 and 197 deenergize) to advance the clock by way of the advance clock gates 67, 71.

Step S16

After draining of the rinse water, the clothes are subjected to a spin operation. This operation is effected by way of the spin gate 42 which has high signal inputs provided thereto from the flip-flop conductors FF-51 and FF-61. The spin gate 42 therefore provides a low output on the conductor C42 and a high output on the conductor $\overline{C42}$. The low output on the conductor C42 is extended to the spin speed portion of the speed selection switch 22 and by way of the contact 175 and the selected contact 176–179 and the selected diode 185, 186 to the appropriate winding 190, 191 of the motor 18 for a high or low spin speed. This same signal is also extended to the driver 169 associated with the spin solenoid winding 197 to energize the winding 197 so that the transmission 16 engages the basket 13.

Spin time is determined by the spin time gate 57 for advancing the clock 39 by way of the advance clock gate 67 and 71 after a predetermined interval, here 4 minutes. With a high input from the conductor FF-21 and a high input from the conductor $\overline{C42}$, a high input from the clock conductor $\overline{4}'$ after a 4-minute spin time will effect advancement of the clock 39.

Without selection of the wash-and-wear option, as discussed above, the stop cool down gate 69 effects advancement of the clock to the end of the washing program.

Step S21

The end of cycle step occurs when the clock has advanced sufficiently to set the flip-flop FF-1 so that it provides a high output on its output conductor FF-11. The flip-flop FF-1 is conditioned to this state by way of an input supplied to its input conductors FF-14, FF-15 from the output conductor FF-21 of the flip-flop FF-2, in response to the flip-flop FF-2 assuming a binary "0" state. The output signal on the conductor FF-11 is carried by the conductor 88 to the flip-flop input FF-16 to prime the flip-flop FF-1 for subsequent reset and is further extended to the power logic circuit 34, as previously mentioned, to cause the transistor 82 to conduct and present a substantially ground signal by way of the diode 81 and the conductor 80 to the gate of the Triac 79. This ground signal on the gate of the Triac 79 terminates conduction of the Triac and accordingly terminates operation of the logic control by preventing the derivation of the dc potential V.

Normal Wash Program

Operation of the automatic washer in accordance with the normal wash program is set forth in the following truth table.

TRUTH TABLE III

| | Normal Wash Program (Second Rinse Not Selected) | | | | | | |
|---|---|---|---|---|---|---|---|
| Step No. | Function | FF-6 | FF-5 | FF-3 | FF-2 | FF-1 | FF-4A |
| S5 | Fill | 0 | 0 | 1 | 0 | 0 | 0 |
| S6 | Wash | 1 | 0 | 1 | 0 | 0 | 0 |
| | ADVANCE | | | | | | |
| S11 | Drain | 0 | 1 | 0 | 1 | 0 | 0 |
| S12 | Spin-Spray | 1 | 1 | 0 | 1 | 0 | 0 |
| S13 | Fill | 0 | 0 | 1 | 1 | 0 | 0 |
| S14 | Deep Rinse | 1 | 0 | 1 | 1 | 0 | 0 |
| S15 | Drain | 0 | 1 | 1 | 1 | 0 | 0 |
| S16 | Spin | 1 | 1 | 1 | 1 | 0 | 0 |
| | ADVANCE | | | | | | |
| S21 | End of Cycle | 0 | 0 | 0 | 0 | 1 | 0 |

Inasmuch as the normal wash program utilizes all but steps S1–S4 of the super wash program which was discussed in detail above, a detailed discussion of this program should not be required here, but may be fully understood by reference to the Truth Table III and the corresponding steps set forth in the above discussion of the super wash program.

Wash-and-Wear Program

The wash-and-wear option for providing the washing program as a wash-and-wear program is accomplished in accordance with the following truth table.

TRUTH TABLE IV

Wash-and-Wear Program Option

| Step No. | Function | FF-6 | FF-5 | FF-3 | FF-2 | FF-1 | FF-4A |
|---|---|---|---|---|---|---|---|
| | [S1 – S6 of Super Wash Program — or — S5 – S6 of Normal Wash Program — then —] | | | | | | |
| S7 | Partial Drain | 0 | 1 | 1 | 0 | 0 | 1 |
| S8 | Advance | 1 | 1 | 1 | 0 | 0 | 1 |
| S9 | Fill | 0 | 0 | 0 | 1 | 0 | 1 |
| S10 | Agitate (Cool Down) | 1 | 0 | 0 | 1 | 0 | 1 |
| | Repeat S7 – S10 until thermostat 174 indicates water temperature below 110°F — then advance to S11. Perform steps S11 – S16 of Normal and Super Wash Programs. [S17 – S20 for second rinse (see Truth Table V) — or — advance to S21] | | | | | | |
| S21 | End of Cycle | 0 | 0 | 0 | 0 | 1 | 0 |

As can be seen from the above truth table, the wash-and-wear treatment may be provided with either the super wash or the normal wash operations, and further with a second rinse operation. Therefore, the above table has been limited to those particular steps which are uniquely involved in the wash-and-wear operation.

Upon fulfillment of Step S6 of either the normal wash program or the super wash program and advancement of the clock 39, the wash-and-wear program option is initiated at the Step S7.

Step S7

The tub is partially drained in this step through an enabling of the drain gate 43 in response to the states of the flip-flops FF-6 and FF-5 which provide high signals to the drain gate 43 by way of the output conductors FF-60 and FF-51. The gate 43 therefore provides a low output signal on the conductor C43 and a high output signal on the conductor $\overline{C43}$. The low output signal on the conductor C43 is extended (in FIG. 9) by way of the diode 87 to energize the high speed winding 190 of the motor 18 via the associated driver circuit 169. With the spin solenoid winding 197 and the agitate solenoid winding 196 deenergized, the motor engages the pump for a fast pumping operation.

The flip-flop FF-2 supplies a high potential by way of its output FF-20 to the partial drain gate 58. The high signal on the conductor $\overline{C43}$ is also applied to an input of the partial drain gate 58 and these signals await a high signal on the conductor C48 which is applied when the water level switch 23 engages the LO contact. When the low position of the water level switch 23 is engaged, the partial drain gate 58 is enabled to cause the clock 39 to be advanced by way of the OR gate 67 and the OR gate 71.

Step S8

The advance step is provided as discussed above in order to maintain uniform decoding gates. In this instance, the step S8 is permitted to occur as an "advance-one-step" function and replaces the spin-spray in this portion of the program. Normally, this step is inhibited by the state of the flip-flop FF-2 as reflected through the advance-one gate 56.

Step S9

The tub 12 is again filled after the partial drain operation. The flip-flops FF-5 and FF-6 by way of their output conductors FF-50 and FF-60 enable the fill gate 45 to provide a high output on the conductor $\overline{C45}$. The high output on the gate $\overline{C45}$ is combined with the high outputs on the conductors FF-21 and FF-30 of the flip-flops FF-2 and FF-3 to enable the cool fill gate 62 and extend a low signal by way of the conductor C62 (FIGS. 8 and 9) to the diode 220 for causing the driver circuit 169 associated with the cold water solenoid winding 198 to energize the winding 198 and fill the tub 12 with cold water only.

Initial selection of the wash-and-wear option is provided by operation of the wash-and-wear switch 20c to engage the contacts 172, 173. With this switch closed, and the water temperature sensed by the thermostat switch 174 at 100°F or greater, the thermostat switch 174 will remain closed applying a logic "0" to the upper input of the stop cool down gate 69 to inhibit operation of the gate and prevent clock advance. Also, the gate 40 (FIG. 6) and the cool down gate 53 (FIG. 7) force the flip-flops FF-3 and FF-2 to reset conditions which they assumed in the step S7 to effect a repetition of partial drain, fill and agitate (Step S10) until the water temperature falls below 110°F.

Step S10

The agitation of the clothes during the cool down period of the wash-and-wear program option is effected by the operation of the agitate gate 44 in response to the output conditions of the flip-flops FF-5 and FF-6 as previously discussed. The operation of the agitate gate 44 again supplies a low signal to the conductor C44 and a high signal to the conductor $\overline{C44}$. A low signal on the conductor C44 is extended by way of the agitate speed portion of the speed selection switch 22 to energize the motor for high or low speed agitation. In addition, this same signal is extended to the driver 169 associated with the agitate solenoid to effect energization of the winding 196.

When the thermostat 174 opens, a logic "1" is applied to the stop cool down gate 69 by way of the interposed inverter to enable the 60 Hz pulses applied to the lower input of the gate 69 over the conductor C100 to advance the clock and place the program at the step S11.

The steps S11 – S16 are equivalent to those of the above normal and super wash programs and reference may be had to the foregoing discussion of the same for the operation of the logic control.

The washing program may include a second rinse as indicated in the Truth Table IV before the program reaches the terminal step S21. The second rinse portion of the program will be discussed immediately following with respect to the second rinse option.

Second Rinse

The washing program may be modified to include selection of a second rinse function through the closure of the second rinse option switch 20d (FIG. 6) to apply a logic "1" to an input of the gate 41.

The second rinse program option is employed with Steps S1 – S6 of the super wash program or with Steps S5 – S6 of the normal wash program, and also possibly with Steps S7 – S10 of the wash-and-wear program option followed by the Steps S11 – S16 which are common to the super and normal wash programs. The program steps for the second rinse program option are set forth in the following truth table.

TRUTH TABLE V

| Step No. | Function | \multicolumn{6}{c}{Second Rinse Program Option} |
|---|---|---|---|---|---|---|---|

| Step No. | Function | FF-6 | FF-5 | FF-3 | FF-2 | FF-1 | FF-4A |
|---|---|---|---|---|---|---|---|
| | | | | | | (S1, S5) | 0 |
| | [S1 – S6 of Super Wash Program — or — S5 – S6 of Normal Wash Program — then — S7 – S10 repetitively if Wash-and-Wear Option is selected — or — advance to S17] | | | | | | |
| | | | | | | (S16) | 0 |
| S17 | Fill | 0 | 0 | 1 | 1 | 0 | 1 |
| S18 | Second Rinse | 1 | 0 | 1 | 1 | 0 | 1 |
| S19 | Drain | 0 | 1 | 1 | 1 | 0 | 1 |
| S20 | Spin | 1 | 1 | 1 | 1 | 0 | 1 |
| | End of Cycle | 0 | 0 | 0 | 0 | 1 | 0 |

S21

After termination of the Step S16 for centrifuging washing liquid from the clothes load, the control system advances to Step S17 to provide filling for the second rinse operation.

Step S17

The flip-flops FF-5 and FF-6 provide high signals on their respective outputs FF-50 and FF-60 to enable the fill gate 45 and provide a high output on the conductor $\overline{C45}$.

The flip-flop FF-4A is normally set high causing the NAND gate 41 to provide a low output to inhibit the flip-flop FF-3 from changing state when the flip-flop FF-5 changes state. The next time that the flip-flop FF-5 changes state, the second rinse shall be completed and the NAND gate 40 will provide a high output to permit the flip-flop FF-3 to change state and effect termination of the program at Step S21.

For the second rinse, the fill rinse gate 72 is provided with all high input signals in the Step S17 inasmuch as the flip-flops FF-2 and FF-3 have high outputs on their output conductors FF-21 and FF-31 and inasmuch as the high output on the conductor $\overline{C45}$ is available. The fill rinse gate 72 therefore provides a low output signal to effect energization of the cold water solenoid winding 198 and/or the hot water solenoid winding 199 in accordance with the setting of the temperature selection switch and the corresponding position of the contact 200 with respect to the contacts 201–205. Filling is sensed, as before, by the application of the high signal on the conductor C49 from the water level switch 23 which, in conjunction with the high signal on the conductor $\overline{C45}$ enables the fill sense gate 66 to advance the clock 39 by way of the advance clock gate 71.

Step S18

The second rinse step has the flip-flop FF-5 providing a high output on its output conductor FF-50 and the flip-flop FF-6 providing a high output on its conductor FF-61. These signals enable the agitate gate 44 to provide a low output on the conductor C44 and a high output on the conductor $\overline{C44}$. The low output signal on the conductor C44 effects operation of the driver 169 associated with the agitate function to energize the agitate solenoid winding 196. This same signal is applied to the agitate speed portion of the speed selection switch 22 and by way of the contacts 180 and a selected one of the contacts 181–184 and the selected one of the diodes 188, 189 to cause energization of the high speed winding 190 or the low speed winding 191 of the motor 18 in accordance with the speed selected by the position of the switch 22.

The high signal applied to the conductor $\overline{C44}$ is employed as an input to the gate 65 (FIG. 8) along with the high input supplied over the conductor FF-21 so that after 2 minutes of agitation and concurrent application of the signal $\overline{2}'$ from the clock 39, the rinse gate 65 is enabled to advance the clock 39 by way of the advance clock gate 71.

Step S19

The flip-flop FF-6 is conditioned to provide a high output on its output conductor FF-60 and the flip-flop FF-5 is conditioned to provide a high output on its output conductor FF-51 to enable the drain gate 43 and cause a low signal to be applied to the conductor C43 and a high signal to be provided to the conductor $\overline{C43}$.

The low signal applied to the conductor C43 is utilized to effect high speed operation of the motor 18 by causing energization of the winding 190 by way of the diode 187 and the driver 169. The agitate and spin mechanisms are not energized; therefore, the motor drives the pump to discharge water from the tub 12.

The high signal carried on the conductor $\overline{C43}$ is applied to the drain gate 59 to await a high signal on the other input of the gate 59 after a two-minute interval established by the clock 39 at its output conductor $\overline{2}'$. After this 2-minute interval, the drain gate 59 is enabled to cause the clock 39 to be advanced by way of the advance clock gate 67 and the advance clock gate 71.

Step S20

As the clock advances, the flip-flops FF-5 and FF-6 change state so as to provide a high signal at their respective outputs FF-51 and FF-61 for enabling the spin gate 42 and causing a high potential to be supplied to the conductor $\overline{C42}$ and a low potential to be supplied to the conductor C42. The low potential supplied to the conductor C42 is extended to the spin speed portion of the speed selection switch 22 and by way of the contacts thereof to the appropriate driver circuit 169 for energizing the selected motor winding 190 or 191.

This same signal on the conductor C42 is utilized to enable the driver 169 connected to the spin solenoid for energizing the spin solenoid winding 197.

The spin time is set in this particular embodiment at four minutes as indicated by the upper input to the spin time gate 57. This input $\overline{4}'$ in combination with the high input supplied on the conductors FF-21 and $\overline{C42}$ enable the spin time gate 57 after a 4-minute interval to advance the clock 39 by way of the advance clock gates 67, 71.

During the Steps S17 – S20, the flip-flop FF-4A has its output FF-4A1 at a high potential which is extended to the driver circuit 169 associated with the second rinse indicator lamp 192 (FIG. 7) to effect illumination of the lamp during the second rinse portion of the program.

Step S21

Upon advancement of the clock in response to the operation of the spin time gate 57, the logic control is conditioned to the Step S21 for termination of the program whereupon the flip-flop FF-1 by way of the conductor 88 causes the transistor 82 of the power logic circuit to become conductive and render the Triac 79 of the power input circuit 31 non-conductive to prevent derivation of the dc potential V and terminate operation of the washing program.

Although I have described my invention by reference to a specific illustrative embodiment thereof, many changes and modifications of my invention may become apparent to those skilled in the art without departing from the spirit and scope of my invention, and it is to be understood that I intend to include within the patent warranted hereon all such changes and modifications as may reasonably and properly be included within the scope of my contribution to the art.

The embodiments of the invention in which an exclusive property or privilege is claimed are defined as follows:

1. A control circuit for an automatic clothes washer having a rotatable receptacle adapted to receive material, a drive motor coupled to the receptacle and operable to impart rotary motion thereto and material treatment means operatively associated with the receptacle, said control circuit comprising:
   a clock for connection to a supply of alternating voltage, said clock operable to provide clock pulses indicative of elapsed time in response to the alternating wave of the supply;
   a memory operable to provide a sequence of unique binary states representing the sequence of operations of a laundry program; and
   a logic control circuit connected between said clock and memory having outputs connected to and the drive motor and material treatment means to control the operation of the drive motor and treatment means in accordance with the laundry program, said logic control circuit including
   indexing means connected to said memory and operable in accordance with unique combinations of elapsed time and memory state to index said memory; and
   selectively operable switch means connected between said clock and said indexing means for establishing selected times for indexing said memory.

2. A control circuit according to claim 1, wherein said clock comprises means for counting cycles of the supply alternating voltage wave and providing the count in binary form.

3. A control circuit according to claim 1, wherein said clock comprises pulse means operable to provide a counting pulse for each cycle of the supply alternating voltage wave and counting means connected to said pulse means for counting said pulses and providing pulse count in binary form.

4. A control circuit according to claim 1, wherein said memory comprises a chain of bistable circuits having a plurality of outputs for presenting the unique binary states as combinations of binary level logic signals.

5. A control circuit according to claim 1, wherein said logic control circuit comprises a plurality of gate circuits connected to said clock and to said memory and operable to provide logic output control signals to the drive motor and to the treatment means.

6. A control circuit for an automatic clothes washer having a rotatable receptacle adapted to receive material, a drive motor coupled to the receptacle and operable to impart rotary motion thereto and material treatment means operatively associated with the receptacle, said control circuit comprising:
   pulse producing means for connection to a supply of alternating voltage, said pulse producing means operable to provide periodically recurring pulses indicative of elapsed time in response to the alternating wave of the supply;
   a counter connected to said pulse producing means for accumulating pulse counts, said counter including a plurality of outputs which assume logic levels indicative of pulse count;
   a memory including a plurality of outputs and operating to provide a unique sequence of logic levels indicative of treatment functions;
   a logic circuit connected to said outputs of said counter and said memory and operable to provide an index signal in response to combinations of logic levels representing predetermined count accumulations in said counter;
   an index circuit included in said counter connected to said memory, and operable in response to an index signal to index said memory;
   combinations of the logic levels at said outputs of said memory representing a programmed sequence of automatic clothes washer functions;
   means connecting said outputs of said counter and memory to said motor and to said treatment means for controlling the operation thereof in accordance with the programmed sequence; and
   selectively operable switch means connected between said counter and said indexing means for establishing selected times for indexing said memory.

* * * * *

UNITED STATES PATENT AND TRADEMARK OFFICE
CERTIFICATE OF CORRECTION

PATENT NO. : 3,922,889
DATED : December 2, 1975
INVENTOR(S) : Joseph Karklys

It is certified that error appears in the above-identified patent and that said Letters Patent are hereby corrected as shown below:

Claim 1, line 41, after "memory" insert --and--;

same line, after "to" delete "and".

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*